United States Patent [19]

Bartz

[11] 4,441,807
[45] Apr. 10, 1984

[54] PHOTOGRAPHIC PRINTING SYSTEM INCLUDING AN IMPROVED MASKING CARD

[75] Inventor: Stephen A. Bartz, Jordan, Minn.

[73] Assignee: Lucht Enginerring, Inc., Minneapolis, Minn.

[21] Appl. No.: 349,649

[22] Filed: Feb. 17, 1982

[51] Int. Cl.³ ............................................. G03B 27/52
[52] U.S. Cl. ......................................... 355/40; 355/68
[58] Field of Search ........................ 355/40, 41, 35, 39, 355/75, 68, 38, 46, 69

[56] References Cited

U.S. PATENT DOCUMENTS

| | | | |
|---|---|---|---|
| 3,829,661 | 8/1974 | Silverman et al. | 355/40 |
| 3,921,318 | 11/1975 | Calavetta | 355/40 |
| 3,951,545 | 4/1976 | Lucht | 355/46 |
| 4,105,156 | 8/1978 | Dethloff | 355/40 |
| 4,264,196 | 4/1981 | von Stein et al. | 355/41 |

*Primary Examiner*—Richard A. Wintercorn
*Attorney, Agent, or Firm*—Kinney, Lange, Braddock, Westman and Fairbairn

[57] ABSTRACT

A photographic printing system including an improved masking card. The masking card carries an image-bearing transparency at an aperture thereof. The card cooperates with a photograhic printer to contribute to the registration of the image relative to the optical path of the printer. A plurality of mark boxes are located at predetermined locations on the card with each location cally readable character font are preprinted at at least some of the marked box locations represent exposures of preselected size. Ghost character outlines of an optically readable character font are preprinted at least some of the marked box locations. An information storage medium is carried by the card and includes a plurality of data blocks each dedicated to a printer exposure parameter, including printer exposure parameters represented by the mark box locations. In a preferred embodiment, those mark box locations representing exposures of preselected size have preprinted ghost character outlines of an optically readable numerical font. The information storage medium may be a magnetic tape and, preferably, a strip of magnetic tape having two tracks with one track providing clock pulses.

7 Claims, 1 Drawing Figure

PHOTOGRAPHIC PRINTING SYSTEM INCLUDING AN IMPROVED MASKING CARD

BACKGROUND OF PRIOR ART

Photographic printers are known to the prior art. Automatic printers typically include supply and take-up rollers for photosensitive photographic material and a mechanism to automatically advance the material through an exposure area or station. A shutter is employed to control the exposure.

An example of the type of printer discussed above is disclosed in U.S. Pat. No. 3,951,545 issued Apr. 20, 1976, in the name of Orren L. Lucht for PHOTOGRAPHIC PRINT APPARATUS which is commonly owned with the present invention and which is hereby incorporated by reference. The printer of this patent employs an interchangeable lens assembly formed of stacked, alternative lens configurations. That is, the different lens configurations are spaced from each other along the general direction of the printer optical path. They are movable, within the lens assembly, between first and second positions—one of those positions being within the optical path of the printer with the other being without the optical path. Selectively actuated plungers are operative to position the desired lens configuration within the printer's optical path.

The printer of the above-incorporated patent provides greater flexibility than other prior art printers and has contributed significantly to the photographic printing industry. Its output is a roll of exposed photographic material which, when processed, produces a roll of photographic prints. Typically, a single image-bearing transparency is employed for multiple exposures of varying sizes. Thus, each exposure may require a change in lens configuration.

Information as to the number of exposures and desired print sizes must be presented to the printer for the selection of the proper lens configuration. Other information such as color balance, crop size, etc., must also be presented. Such information may be presented manually, a time consuming operation. Alternatively, the information may be recorded on information storage media, such as a reel of magnetic tape, for automatic control of the exposure parameters. This has been done sequentially for multiple transparencies requiring that the transparency sequence be maintained. Further, the recording process is a manual one and does not offer an efficient check on the data entered.

BRIEF SUMMARY OF INVENTION

The present invention provides an automatic control of printer exposure parameters and employs an improved masking card. As in the prior art, a transparency bearing the image to be printed is carried by the masking card with the image at an aperture thereof. Within the printer, the card contributes to the registration of the image relative to the printer optical axis.

In the improved masking card, a plurality of mark boxes are identified at predetermined locations on the card, each mark box location representing a printer exposure parameter. At least some of the mark box locations represent exposures of preselected size with ghost character outlines of an optically readable character font being preprinted at at least some of the mark box locations. Information storage media is carried by the card and includes a plurality of data blocks dedicated to a printer exposure parameter including printer exposure parameters represented by the mark box locations. Exposure parameter data may be entered at a mark box location having a ghost character outline by tracing over those portions of the ghost character outline that form the desired character. An optical character reader may then be employed to read the exposure parameter data and record the same on the information storage media at a data block dedicated to that exposure parameter. With all the desired exposure parameter data recorded on the information storage media, a simple media reader may be employed, with a decoder, to generate control commands to the printer to automatically control the transparency exposure.

In a preferred embodiment of the system of the present invention, those mark box locations representing exposures of preselected size have preprinted ghost character outlines of an optically readable numerical font so as to assist in the entry of an optically readable indication of the number of prints of each size desired. The information storage medium may be a magnetic tape and, preferably, a strip of magnetic tape including one track to provide clock pulses. In this manner, the card provides its own system clock rendering its speed through the reader non-critical. Information other than exposure parameters may also be recorded on the magnetic tape, including a personal indentification, as of the studio which took the picture, for example.

BRIEF DESCRIPTION OF DRAWINGS

The single FIGURE illustrates a preferred embodiment of a masking card used in the system of the present invention.

DETAILED DESCRIPTION OF INVENTION

Figure 1:
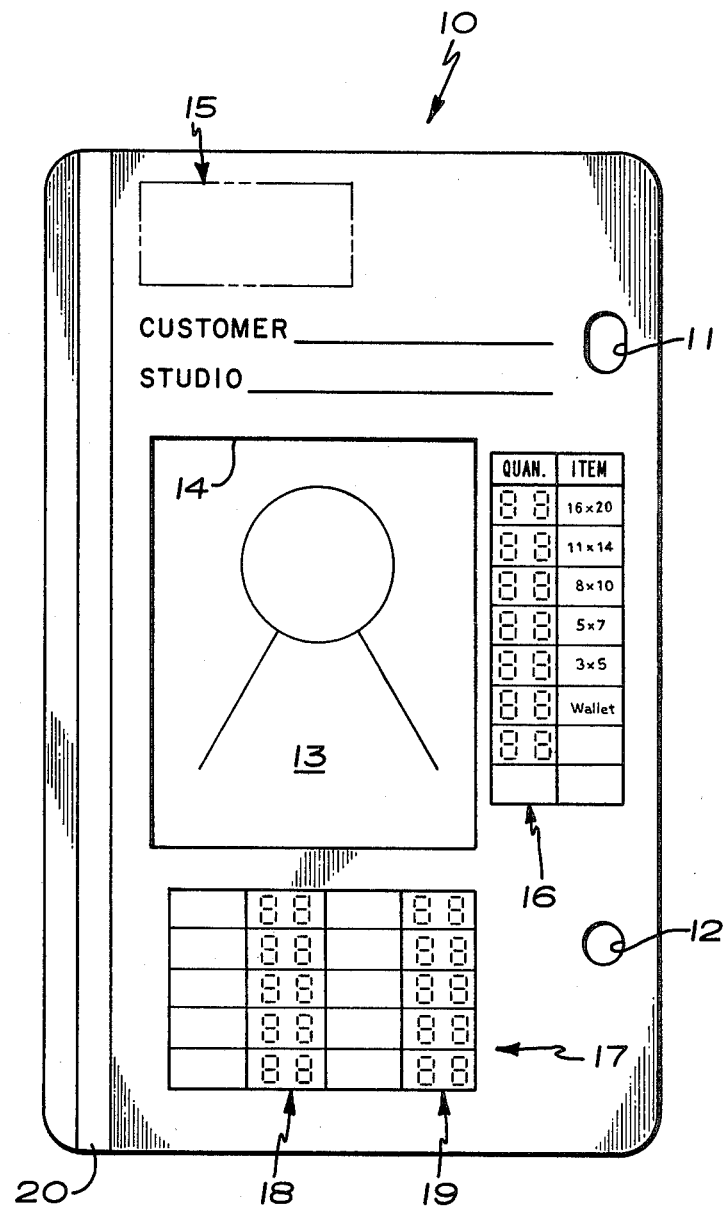

With reference to the single FIGURE, there is shown a card employed within the system of the present invention. The card is designated generally at 10 and includes registration apertures 11 and 12. An image-bearing transparency 13 is positioned at an aperture 14 in the card 10, the transparency 13 being taped to the back of the card as viewed in the FIGURE with the desired image positioned within the aperture 14 in relation to the borders of the aperture 14 as it is desired to have the image in relation to the borders of the ultimate print. In this manner, the aperture 14 of the card 10 provides at least a rough cropping of the transparency. The apertures 11 and 12 cooperate with printers of known design to position the image on transparency 13 in proper registration relative to the optical axis of the printer.

Cards of the type described above have been employed by photographic laboratories and frequently include an identification of the laboratory as indicated at 15 while providing a space for entry of the customer's name (the person for whom the prints are intended) as well as the studio or person who took the picture and produced the transparency. Tables have also been provided for the written entry of information as to the number of a particular size print that is desired. The information on the tables may be read and manually entered to control the printer directly or, alternatively, may be entered onto an information storage media which is then read to control the printer. The latter operation has been performed on a "batch" basis requiring that the cards be maintained in the same sequence in which the information is stored on the storage media.

The present invention provides mark boxes, in tabular form if preferred, with each mark box location representing a printer exposure parameter. For example, some of the mark boxes forming the lefthand column of a table 16 represent exposures of preselected sizes with those sizes being printed in a column immediately to the right of the column formed by the mark boxes. Other mark boxes may be positioned elsewhere on the card 10 as indicated in the table indicated generally at 17 with the columns indicated at 18 and 19 forming the mark boxes with the table columns immediately to the left of the mark box columns 18 and 19 having indicia that gives a visual indication of what is represented by the mark box immediately to its right. The mark boxes within the columns 18 and 19 may be a locations representative of any printer exposure parameter such as color, crop size, etc. Mark box location is arbitrary, but the same location on every card will represent the same variable. Also, the mark boxes are outlined to provide a visual indication of their position. The term "box" is not limited to a rectangular area or location. A magnetic strip 20 runs along one edge of the card 10.

While the FIGURE illustrates the mark boxes as forming columns, any location on the card other than within the apertures 11, 12 or 14 or along the magnetic tape 20 may be predetermined as representing a printer exposure parameter such that data recorded at that location will be identified as designating that predetermined printer exposure parameter. Within the illustrated embodiment, each of the mark box locations within columns 18 and 19, and all but one of the mark box locations in the lefthand column of table 16, have preprinted ghost character outlines of an optically readable character font. For the purpose of this specification and claims, the term "ghost character outline" is intended to mean a character outline that is visually perceptible but which is below the detection threshold of an optical character reader. Such thresholds will vary from reader to reader as may the particular character font which the reader will recognize. The present invention is intended for implementation with any known optical character reader with the ghost character outlines being dependent upon the character font to which the reader will respond.

The lefthand column of table 16 represents, at some mark box locations, the quantity of prints of a particular size, the size being indicated in the righthand column. By tracing, with a suitable pencil or pen, in known manner, those portions of the character outline in the lefthand column mark boxes that represent the desired number of prints of a size represented by the mark box location, a manual, optically readable character (numeral) is produced at the mark box location. These trace characters may then be optically read with the detected number, and the location of the mark box serving to indicate the desired number of each print size. Since only numerals need be entered, those mark box locations representing the quantity of a particular print size may contain an optically readable numerical font. The familiar character outline of a 7-bar display is suitable for this purpose and is illustrated at all mark box locations having a preprinted ghost character outline. Of course, other optically readable character font outlines may be employed—either numeric or alphanumeric.

In a preferred embodiment, the magnetic strip 20 is a dual track strip, one track being prerecorded to provide clock pulses. In this manner, the reading speed of the tape is rendered non-critical in that that speed will determine the frequency of the clock pulses. The other track of tape 20 includes a plurality of data blocks dedicated to printer exposure parameters including those printer exposure parameters represented by the mark box locations of tables 16 and 17. Thus, with data entered in the mark box locations of the tables 16 and 17, as by tracing the relevant portions of the ghost character outlines, those locations may be read by an optical character reader with that information then being recorded in the associated printer exposure parameter data block dedicated to the particular parameter. Thus, the card may carry the entirety of the necessary exposure parameters such that card sequence is non-critical during the printing operation. That is, the cards, each bearing the necessary exposure information independently of the other cards or an independently recorded record, may be processed in any desired sequence. Also, the information on the data blocks of tape 20 may be automatically verified by reading the mark boxes with an optical character reader and the tape and comparing the data. The tape 20 may also contain data blocks on the non-clock track for such information as personal identification, an indentification of the studio which produced the transparency, for example.

Obviously, many modifications and variations of the present invention are possible in light of the above teachings. For example, the strip of tape 20 may be replaced by individual strips of recording medium each dedicated to one or more printer exposure parameters or personal or other identification codes. As noted above, the mark boxes may be positioned at any available location on the card, the particular location forming no part of the present invention beyond the fact that a particular location be designated as representing a printer exposure parameter. Any optical character font capable of being optically read or recognized may be employed with appropriate preprinted ghost character outlines being employed where appropriate. It is therefore to be understood that, within the scope of the appended claims, the invention may be practiced otherwise than as specifically described.

I claim:

1. A masking card for use in a photographic printing system of the type wherein a transparency bearing an image to be printed is positioned within a photographic printer, the transparency being carried by the masking card with the image to be printed at an aperture thereof and the card contributing to registration of the image within the printer, the masking card improvement for the automatic control of printer exposure parameters which comprises:

a plurality of mark boxes in predetermined locations on said card, each mark box location representing a printer exposure parameter with at least some of said mark box locations representing exposures of preselected size and at least some of said mark box locations having preprinted ghost character outlines of an optically readable character font; and information storage means carried by said card including a plurality of data blocks dedicated to a printer exposure parameter including printer exposure parameters represented by said mark box locations.

2. The card of claim 1 wherein said mark box locations representing exposures of preselected size have preprinted ghost character outlines of an optically readable numeral font.

3. The card of claim 2 wherein said information storage means comprises magnetic tape.

4. The card of claim 2 wherein said information storage means comprises a strip of magnetic tape.

5. The card of claim 2 wherein said information storage means comprises a strip of dual track magnetic tape, one tape track including said data blocks and the other tape track including means for providing clock pulses.

6. The card of claim 5 wherein said numerical font ghost character outlines comprise seven bar outline means.

7. The card of claim 6 further comprising at least one data block of said one tape track dedicated to personal identification.

* * * * *